(12) United States Patent
DeCusatis

(10) Patent No.: US 9,268,160 B2
(45) Date of Patent: *Feb. 23, 2016

(54) THREE DIMENSIONAL IMAGE PROJECTOR WITH SINGLE MODULATOR

(71) Applicant: International Business Machines Corporation, Armonk, NY (US)

(72) Inventor: Casimer M. DeCusatis, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/651,715

(22) Filed: Oct. 15, 2012

(65) Prior Publication Data

US 2013/0188102 A1 Jul. 25, 2013

Related U.S. Application Data

(63) Continuation of application No. 13/357,719, filed on Jan. 25, 2012.

(51) Int. Cl.
*G02F 1/1335* (2006.01)
*G03B 21/20* (2006.01)
(Continued)

(52) U.S. Cl.
CPC .......... *G02F 1/1313* (2013.01); *G02F 1/13362* (2013.01); *G03B 21/2013* (2013.01); *G03B 21/2073* (2013.01); *G03B 35/26* (2013.01)

(58) Field of Classification Search
CPC .................................................... G03B 21/2013
USPC ........................................................... 349/8
See application file for complete search history.

(56) References Cited

U.S. PATENT DOCUMENTS 4,630,097 A 12/1986 Marks
4,870,486 A 9/1989 Nakagawa et al.
(Continued)

FOREIGN PATENT DOCUMENTS

CN 1624525 A 6/2005
CN 1666269 A 9/2005
(Continued)

OTHER PUBLICATIONS

U.S. Appl. No. 13/672,980; Non Final Office Action; filed Nov. 9, 2012; Date Mailed: Nov. 8, 2013; pp. 1-41.
(Continued)

*Primary Examiner* — Edward Glick
*Assistant Examiner* — Alexander Gross
(74) *Attorney, Agent, or Firm* — Cantor Colburn LLP; Steven Chiu

(57) ABSTRACT

A method of projecting a three-dimensional image is provided. The method includes providing a first light source, the first light source emitting light at a first polarization. A second light source is provided opposite the first light source, the second light source emitting light at a second polarization. A liquid crystal on silicone (LCoS) image device is provided. A beam splitter device is provided between the first light source and the second light source adjacent the LCoS image device. The beam splitter device is rotated. A first light is emitted from the first light source. The first light is reflected with the beam splitter device onto the LCoS image device. A second light is emitted from the second light source after the first light is emitted. The second light is reflected with the beam splitter device onto the LCoS image device.

9 Claims, 3 Drawing Sheets

(51) Int. Cl.
*G03B 35/26* (2006.01)
*G02F 1/13* (2006.01)

(56) References Cited

U.S. PATENT DOCUMENTS

| | | | |
|---|---|---|---|
| 5,113,285 A | 5/1992 | Franklin et al. | |
| 5,142,366 A | 8/1992 | Brown et al. | |
| 5,168,199 A | 12/1992 | Huffman et al. | |
| 5,420,484 A | 5/1995 | Morrish | |
| 5,751,479 A | 5/1998 | Hamagishi et al. | |
| 6,040,946 A | 3/2000 | Hebert | |
| 6,327,093 B1 | 12/2001 | Nakanishi et al. | |
| 6,344,927 B1 | 2/2002 | Itoh et al. | |
| 6,359,664 B1 | 3/2002 | Faris | |
| 6,672,722 B2 | 1/2004 | O'Connor et al. | |
| 6,704,065 B1 | 3/2004 | Sharp et al. | |
| 6,813,085 B2 | 11/2004 | Richards | |
| 7,081,997 B2 | 7/2006 | Sedlmayr | |
| 7,119,957 B2 | 10/2006 | Itoh et al. | |
| 7,270,428 B2 | 9/2007 | Alasaarela et al. | |
| 7,283,308 B2 | 10/2007 | Cossairt et al. | |
| 7,401,923 B2 | 7/2008 | Fergason | |
| 7,446,733 B1 | 11/2008 | Hirimai | |
| 7,468,844 B2 | 12/2008 | Hall, Jr. | |
| 7,477,220 B2 | 1/2009 | Muto | |
| 7,561,322 B1 | 7/2009 | Maeda et al. | |
| 7,649,915 B2 | 1/2010 | Fermann et al. | |
| 7,692,605 B2 | 4/2010 | Tsao | |
| 7,766,490 B2 | 8/2010 | Harbers et al. | |
| 7,773,160 B2 | 8/2010 | Yamazaki et al. | |
| 7,848,370 B2 | 12/2010 | Kewitsch et al. | |
| 8,337,020 B2 | 12/2012 | Handschy et al. | |
| 8,388,138 B1 | 3/2013 | Boothroyd | |
| 2002/0191235 A1 | 12/2002 | O'Connor et al. | |
| 2003/0179791 A1 | 9/2003 | Hiroshi et al. | |
| 2004/0109329 A1 | 6/2004 | Kato | |
| 2004/0155207 A1* | 8/2004 | Kleinschmidt | 250/504 R |
| 2004/0201879 A1* | 10/2004 | Shih et al. | 359/291 |
| 2004/0207879 A1 | 10/2004 | Bailey et al. | |
| 2006/0050049 A1 | 3/2006 | Lin | |
| 2006/0187393 A1 | 8/2006 | Kuan et al. | |
| 2006/0232845 A1 | 10/2006 | Harned et al. | |
| 2006/0238716 A1* | 10/2006 | Lee et al. | 353/20 |
| 2006/0279662 A1 | 12/2006 | Kapellner et al. | |
| 2006/0290889 A1 | 12/2006 | Robinson et al. | |
| 2007/0035830 A1 | 2/2007 | Matveev et al. | |
| 2007/0115230 A1 | 5/2007 | Tajiri et al. | |
| 2007/0139519 A1 | 6/2007 | DeCusatis et al. | |
| 2007/0139618 A1 | 6/2007 | DeCusatis et al. | |
| 2007/0139769 A1 | 6/2007 | DeCusatis et al. | |
| 2007/0146880 A1 | 6/2007 | Bleha et al. | |
| 2007/0181834 A1 | 8/2007 | Kleinschmidt | |
| 2007/0188863 A1 | 8/2007 | Sun et al. | |
| 2007/0195408 A1* | 8/2007 | Divelbiss et al. | 359/462 |
| 2008/0018999 A1 | 1/2008 | Schuck et al. | |
| 2008/0043295 A1 | 2/2008 | Sakakibara | |
| 2008/0055550 A1 | 3/2008 | Kim | |
| 2008/0094577 A1 | 4/2008 | Krijn et al. | |
| 2008/0151193 A1 | 6/2008 | Reder | |
| 2009/0040463 A1 | 2/2009 | Chen et al. | |
| 2009/0086016 A1 | 4/2009 | Su | |
| 2009/0141242 A1 | 6/2009 | Silverstein et al. | |
| 2009/0180181 A1 | 7/2009 | Oakley | |
| 2009/0207379 A1 | 8/2009 | Oakley | |
| 2009/0231549 A1 | 9/2009 | Chen et al. | |
| 2009/0310042 A1 | 12/2009 | Vidal et al. | |
| 2010/0039624 A1 | 2/2010 | Fujinawa et al. | |
| 2010/0045938 A1 | 2/2010 | Lin et al. | |
| 2010/0110386 A1* | 5/2010 | Handschy et al. | 353/20 |
| 2010/0118276 A1 | 5/2010 | Li | |
| 2010/0141856 A1 | 6/2010 | Schuck et al. | |
| 2010/0171909 A1 | 7/2010 | Handschy | |
| 2010/0189344 A1* | 7/2010 | Maes | 382/162 |
| 2010/0208210 A1 | 8/2010 | Aastuen et al. | |
| 2010/0238097 A1 | 9/2010 | Baik et al. | |
| 2010/0238413 A1 | 9/2010 | Huang | |
| 2010/0253769 A1 | 10/2010 | Coppeta et al. | |
| 2010/0272138 A1 | 10/2010 | Chiba et al. | |
| 2011/0089315 A1 | 4/2011 | Walt et al. | |
| 2011/0116051 A1 | 5/2011 | Young et al. | |
| 2011/0149253 A1* | 6/2011 | Mihashi | 353/85 |
| 2011/0204793 A1 | 8/2011 | Gardner, Jr. | |
| 2011/0205251 A1 | 8/2011 | Auld | |
| 2011/0211168 A1 | 9/2011 | Kim et al. | |
| 2011/0273539 A1 | 11/2011 | Yoon et al. | |
| 2012/0019529 A1 | 1/2012 | Kimpe | |
| 2012/0050261 A1 | 3/2012 | Feng et al. | |
| 2012/0287144 A1 | 11/2012 | Gandhi et al. | |
| 2012/0307211 A1 | 12/2012 | Hofmann et al. | |
| 2013/0077283 A1 | 3/2013 | Li | |
| 2013/0082994 A1 | 4/2013 | Al-Dahle | |
| 2013/0147393 A1 | 6/2013 | Bazzani et al. | |

FOREIGN PATENT DOCUMENTS

| | | |
|---|---|---|
| CN | 1721961 A | 1/2006 |
| CN | 1854810 A | 11/2006 |
| CN | 1885096 A | 12/2006 |
| CN | 1987552 A | 6/2007 |
| CN | 101196615 A | 6/2008 |
| CN | 101364037 A | 2/2009 |
| CN | 101373054 A | 2/2009 |
| CN | 101482665 A | 7/2009 |
| CN | 101571631 A | 11/2009 |
| CN | 101625467 A | 1/2010 |
| CN | 101770150 A | 7/2010 |
| CN | 201576164 U | 9/2010 |
| CN | 102043254 A | 5/2011 |
| CN | 102089701 A | 6/2011 |
| CN | 102193239 A | 9/2011 |
| CN | 202057900 U | 11/2011 |
| CN | 102289141 A | 12/2011 |
| CN | 102300108 A | 12/2011 |
| JP | 2000284223 A | 10/2000 |
| JP | 2001222064 A | 8/2001 |
| JP | 2007065408 A | 3/2007 |
| JP | 2008064809 A | 3/2008 |
| WO | 9952269 | 10/1999 |
| WO | 2005032150 A1 | 4/2005 |
| WO | 2008042615 A1 | 4/2008 |
| WO | 2010143891 A2 | 12/2010 |

OTHER PUBLICATIONS

U.S. Appl. No. 13/357,737; Notice of Allowance; filed Jan. 25, 2012; Date Mailed: Nov. 22, 2013; pp. 1-56.
U.S. Appl. No. 13/672,947; Non Final Office Action; filed Nov. 9, 2012; Date Mailed: Nov. 26, 2013; pp. 1-40.
International Application No. PCT/CN2013/070865; International Search Report and Written Opinion dated May 2, 2013, 14 pages.
International Application No. PCT/CN2013/070883; International Search Report and Written Opinion dated May 2, 2013, 12 pages.
International Application No. PCT/CN2013/070831; International Search Report and Written Opinion dated May 9, 2013, 11 pages.
International Application No. PCT/CN2013/070888; International Search Report and Written Opinion dated May 2, 2013, 11 pages.
International Application No. PCT/CN2013/070828; International Search Report and Written Opinion dated Apr. 25, 2013, 13 pages.
U.S. Appl. No. 13/357,704; Non Final Office Action; filed Jan. 25, 2012; Date Mailed: Jul. 15, 2013; pp. 1-24.
U.S. Appl. No. 13/357,725; Non Final Office Action; filed Jan. 25, 2012; Date Mailed: Jul. 15, 2013; pp. 1-28.
U.S. Appl. No. 13/357,719; Non Final Office Action; filed Jan. 25, 2012; Date Mailed: Jul. 26, 2013; pp. 1-33.
U.S. Appl. No. 13/672,877; Non Final Office Action; filed Nov. 9, 2012; Date Mailed: Oct. 3, 2013; pp. 1-24.
Chen et al.; "Simple Multimode Stereoscopic Liquid Crystal Display"; Japanese Journal of Applied Physics; Part 2 (Letters); vol. 36; No. 12B; pp. L1685-L1688; Dec. 15, 1997.
Fergason et al.; An innovative beamsplitter-based stereoscopic/3D display design, Proceedings of SPIE—The International Society for Optical Engineering; vol. 5664; No. 1; pp. 488-494; Mar. 22, 2005.

(56) References Cited

OTHER PUBLICATIONS

Pezzaniti et al.; "Flat Panel 3D Display for Unmanned Ground Vehicles"; Proceedings of SPIE—The International Society for Optical Engineering; vol. 7332; pp. 73320N, 2009.
U.S. Appl. No. 13/357,704; Final Office Action; filed Jan. 25, 2012; Date Mailed: Oct. 30, 2013; pp. 1-23.
U.S. Appl. No. 13/673,112; Non Final Office Action; filed Nov. 9, 2012; Date Mailed: Dec. 13, 2013; pp. 1-42.
U.S. Appl. No. 13/357,725; Notice of Allowance; filed Jan. 25, 2012; Date Mailed: Nov. 20, 2013; pp. 1-33.
U.S. Appl. No. 13/651,780; Notice of Allowance; filed Oct. 15, 2012; Date Mailed: Dec. 23, 2013 pp. 1-21.
U.S. Appl. No. 13/357,707; Final Office Action: filed Jan. 25, 2014; Date Mailed: Jun. 12, 2014; 22 pages.
U.S. Appl. No. 13/673,462; Final Office Action; filed Nov. 9, 2012; Date Mailed: Jun. 12, 2014; 19 pages.
U.S. Appl. No. 13/357,719; Final Office Action; filed Jan. 25, 2012; Date Mailed: Jun. 19, 2014; pp. 1-44.
U.S. Appl. No. 14/051,477; Non-Final Office Action; filed Oct. 11, 2013; Date Mailed Jun. 20, 2014; 31 pages.
U.S. Appl. No. 13/672,877; Notice of Allowance; filed Nov. 9, 2012; Date Mailed: Jun. 25, 2014, pp. 1-11.
U.S. Appl. No. 13/672,877; Final Office Action; filed Nov. 9, 2012; Date Mailed: Mar. 26, 2014; pp. 1-18.
International Search Report for International Application No. PCT/CN2013/076777; Date Mailed: Mar. 13, 2014, 11 pages.
U.S. Appl. No. 13/357,707; Non Final Office Action; filed Jan. 25, 2012; Date Mailed: Feb. 4, 2014; pp. 1-56.
U.S. Appl. No. 13/357,715; Non Final Office Action; filed Jan. 25, 2012; Date Mailed: Feb. 26, 2014; pp. 1-40.
U.S. Appl. No. 13/357,767; Non Final Office Action; filed Jan. 25, 2012; Date Mailed: Mar. 10, 2014; pp. 1-37.
U.S. Appl. No. 14/062,920; Non Final Office Action; filed Oct. 25, 2013; Date Mailed: Mar. 10, 2014; pp. 1-33.
U.S. Appl. No. 13/357,704; Non-Final Office Action; filed Jan. 25, 2012; Date Mailed: Mar. 18, 2014; pp. 1-36.
U.S. Appl. No. 13/357,725; Non-Final Office Action; filed Jan. 25, 2012; Mailing Date: Mar. 21, 2014; pp. 1-14.
U.S. Appl. No. 13/651,780; Notice of Allowance; filed Oct. 15, 2012; Date Mailed: Feb. 28, 2014, pp. 1-14.
U.S. Appl. No. 13/672,980; Notice of Allowance; filed Nov. 9, 2012; Date Mailed: Mar. 26, 2014; pp. 1-17.
U.S. Appl. No. 13/357,719; Final Office Action; filed Jan. 25, 2012; Date Mailed: Jan. 27, 2014; pp. 1-37.
U.S. Appl. No. 13/673,462; Non-Final Office Action; filed Nov. 9, 2012; Date Mailed: Jan. 30, 2014; pp. 1-53.
U.S. Appl. No. 13/357,737; Notice of Allowance; filed Jan. 25, 2012; Date Mailed: Jan. 13, 2014; pp. 1-17.
U.S. Appl. No. 13/357,725; Notice of Allowance; filed Jan. 25, 2012; Date Mailed: Jan. 17, 2014; pp. 1-16.
U.S. Appl. No. 13/673,112; Notice of Allowance; filed Nov. 9, 2012; Date Mailed: Apr. 30, 2014; pp. 1-24.
U.S. Appl. No. 13/672,947; Notice of Allownce; filed Nov. 9, 2012; Date Mailed: Apr. 30, 2014; pp. 1-23.
U.S. Appl. No. 13/673,462; Non-Final Office Action, Issued Oct. 27, 2014; 14 pages.
U.S. Appl. No. 14/051,477; Notice of Allowance; filed Oct. 11, 2013; Date Mailed: Oct. 9, 2014; 13 pages.
U.S. Appl. No. 13/357,707; Final Office Action; filed Jan. 25, 2012; Date Mailed: May 29, 2015; 14 pages.
U.S. Appl. No. 13/357,707; Non-Final Office Action; filed Jan. 25, 2012; Date Mailed: Oct. 28, 2014; 14 pages.
U.S. Appl. No. 13/673,462; Final Office Action, filed Nov. 9, 2012; Date Mailed: Jun. 1, 2015; 14 pages.
U.S. Appl. No. 13/673,462; Non Final Office Action, Date Filed Nov. 9, 2012; Date Mailed Sep. 25, 2015; 13 pages.

* cited by examiner

THREE DIMENSIONAL IMAGE PROJECTOR WITH SINGLE MODULATOR

PRIORITY

This application is a continuation application of U.S. patent application Ser. No. 13/357,719, filed Jan. 25, 2012, the entire contents of which are herein incorporated by reference.

BACKGROUND

The present invention relates to a stereoscopic three dimensional image projector, and more specifically, to a small three dimensional projector usable with passive glasses.

Three dimensional (3D) movies and pictures have become a popular form of entertainment due to the increased realism of the images. 3D images utilize the human physical trait of binocular vision. Human eyes are spaced about 2 inches (5 centimeters) apart, therefore each eye sees the world from a slightly different perspective. The brain receives both images and has a binocular vision function that correlate the difference between what each eye sees to determine distance. The determination of the distance provides the three-dimensional effect that a person sees.

To create a binocular image on a two dimensional surface, such as a movie or television screen, the user typically wears glasses. The glasses alter the way that the user views the images to create the simulated 3D effect. Typically there are two types of glasses, passive glasses and active glasses. The type of glasses used will depend on the type of image projection system being used.

Passive glasses rely upon an optical effect created by using different lenses for each eye. The projection system emits a sequential series of images where subsequent images are slightly offset. The images are arranged such that the user sees the first image through a first lens of the glasses (e.g. the right eye) and the second image is seen with the other lens (e.g. the left eye). Since the images are projected quickly, the user does not notice the multiple images, but rather sees a three dimensional effect. Originally, passive glasses used different color lenses to filter out images, however this limited the use of 3D images when full color images are desired. To alleviate this issue, polarized lenses were developed where each lens of the glasses allowed the transmission of different polarized light. The polarized passive lenses allowed for full color 3D images to be transmitted. Passive lenses are more common with projector type systems, such as movie theaters for example, where multiple projectors may be used to project the images on a screen.

The development of 3D television systems created a new challenge as there typically isn't enough room for multiple projectors. To accommodate this, active lenses were created. With an active lens, the glasses wirelessly communicate with the projector to synchronize the glasses operation with the images being displayed. With active glasses, the lenses are typically liquid crystal displays that can switch between transmitting light and blocking light. In this way, the glasses may rapidly switch the left and right lenses between clear and opaque. While the glasses are switching, the television is projecting a series of sequential images. When this switching is synchronized between the television and the glasses, the user experiences a three dimensional effect.

Accordingly, while existing three dimensional projectors are suitable for their intended purpose a need for improvement remains, particularly in providing a system with a single projector that can project images viewable with passive glasses.

SUMMARY

According to one embodiment of the invention, a method is provided having a first light source, the first light source emitting light at a first polarization. A second light source is provided opposite the first light source, the second light source emitting light at a second polarization. A liquid crystal on silicone (LCoS) image device is provided. A beam splitter device is provided between the first light source and the second light source adjacent the LCoS image device. The beam splitter device is rotated. A first light is emitted from the first light source. The first light is reflected with the beam splitter device onto the LCoS image device. A second light is emitted from the second light source after the first light is emitted. The second light is reflected with the beam splitter device onto the LCoS image device.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Contemporary three-dimensional (3D) image projectors that use passive glasses have typically use two projectors. Previous efforts to use only a single projector rely upon an active lens within the projector that switches between the sequential images. It should be appreciated that substantial costs may be involved in using redundant projectors or having a costly active lens. Further, these techniques do not scale well as users desire comparable performance from smaller and smaller projector packages.

A second type of projector uses active glasses having a liquid crystal diode (LCD) lens that coordinates with the projector (typically a television). The active glasses alternately block one of the lenses such that the user will see sequential images through alternating lenses. While active glasses perform well to create the 3D effect for the user, they also have some less desirable characteristics. The active glasses require an energy source such as a battery that needs to be periodically recharged or replaced. If the communication between the television and the glasses is interrupted, the 3D effect may be lost. Further, due to the complexity of the system, the active glasses tend to be much more costly.

Figure 1:
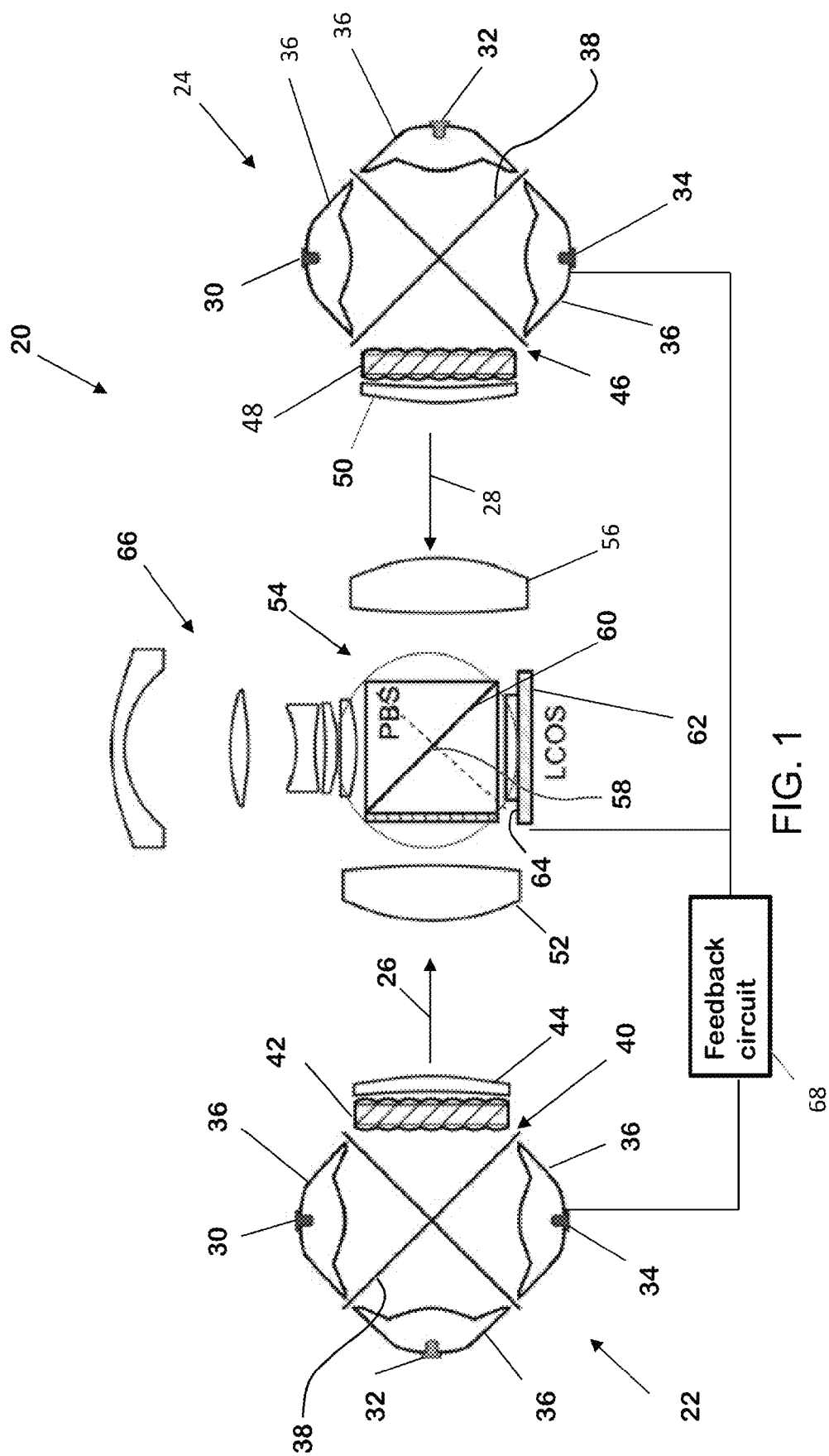
FIG. 1 is a schematic view of a three-dimensional image projector in accordance with an embodiment of the invention.

With reference now to FIG. 1, a three dimensional projector 20 is shown for projecting a three dimensional (3D) image from a single projection lens in accordance with an embodiment of the invention. The projector 20 includes a first light source 22 and an opposing second light source 24. The light sources are arranged to direct light towards each other. In other words, the direction of light from first light source 22, indicated by arrow 26 is substantially 180 degrees apart from the light emitted by light from second light source 24 as indicated by arrow 28. In the exemplary embodiment, each light source includes three monochromatic light emitting diodes (LED), a red LED 30, a green LED 32 and a blue LED 34. The LED's 30, 32, 34 are arranged to form three sides of a square and direct light toward the center of light source 22, 24. Each LED 30, 32, 34 may be coupled to direct light into a light collection optic 36.

The light collection optic 36 directs the light from the LED's 30, 32, 34 into a dichroic color combiner 38. The dichroic color combiner 38 combines light from the LED's to create a desired light color. The light from the first light source 22 exits via an open side 40 and passes through a fly's eye lens 42 and a pre-polarizer lens 44. The fly's eye lens 42 consists of an array of lenslets that have the effect of breaking the transmitted light into many components and projecting them evenly over the field of view. The result is even, bright illumination without any reduction in light intensity at the periphery of the projected light. The pre-polarizer lens 44 changes the polarization of the outgoing light to have a desired polarization characteristic that is suitable for the imaging device being used. Once the light leaves the pre-polarization lens 42, the light passes through a focusing lens 52 that focus' the light into a polarizing beam splitter 54 (PBS).

Similar to the first light source 22, the light from the second light source 24 leaves an open side 46 and enters a fly's eye lens 48 and a pre-polarization lens 50. After being conditioned by these lenses 48, 50, the light passes through a focusing lens 56 before entering the PBS 54.

A PBS 54 is an optical component that splits incident light rays into a first (transmitted) polarization component and a second (reflected) polarization component. In the exemplary embodiment, the PBS 54 is a device arranged to rotate about an axis 58. The PBS 54 has a surface 60 that alternately reflects the light from the light sources 22, 24 as it rotates onto an imaging device 62. The light reflects off of the imaging device 62 with a polarization that then substantially transmits through the PBS 54 and out of the projector 20.

In one embodiment, the light sources 22, 24 are arranged substantially the same distance (equidistant) from the PBS 54. This provides advantages in that the light from each source will travel along a substantially the same path length to project the image from the projector 20. This simplifies the modulation of the light sources 22, 24 to the polarizing beam splitter.

In the exemplary embodiment, the imaging device 62 is a liquid crystal on silicone (LCoS) type device that has an imaging surface 64 adjacent the PBS 54. In operation, the light from a lighting source 22, 24 reflects off the surface 60 onto the imaging device 62 which reflects the light back through the PBS 54 and into a projection lens assembly 66 and out of the device 20. The use of an LCoS image device 62 provides advantages in that the LCoS device 62 inherently polarizes the reflected light.

In some embodiments, it should be appreciated that the combination of the light sources 22, 24, PBS 54 and LCoS device 62 provide advantages in reducing the size of the projector into the category of a pico-projector or micro-projector. These small projectors may be suitable to be used in a portable electronic device, such as but not limited to a cellular phone, a tablet computer, a laptop computer, and a hand-held gaming device for example. Embodiments of the present invention may also be used in non-portable devices, such as but not limited to a desktop computer or a television for example. In one embodiment, the projector 20 may be contained within a housing 5-10.5 mm×20-37 mm×20-37 mm.

The projector 20 may also include an optional feedback circuit 68. The feedback circuit 68 is electrically coupled to communicate with the first light source 22, the second light source 24, the PBS 54 and the LCoS image device 62. The feedback circuit 68 provides a modulation signal to the light sources 22, 24, to keep the light sources and LCoS device 62 synchronized during operation. In other words, the feedback circuit 68 ensures that the desired light source 22, 24 is emitting light that corresponds to the image being displayed on the image surface 64. In the exemplary embodiment, the PBS 54 rotates at a speed two times the frequency of the modulation signal. In one embodiment, the projector 20 consumes 30 milliwatts or less electrical power during operation.

Figure 2:
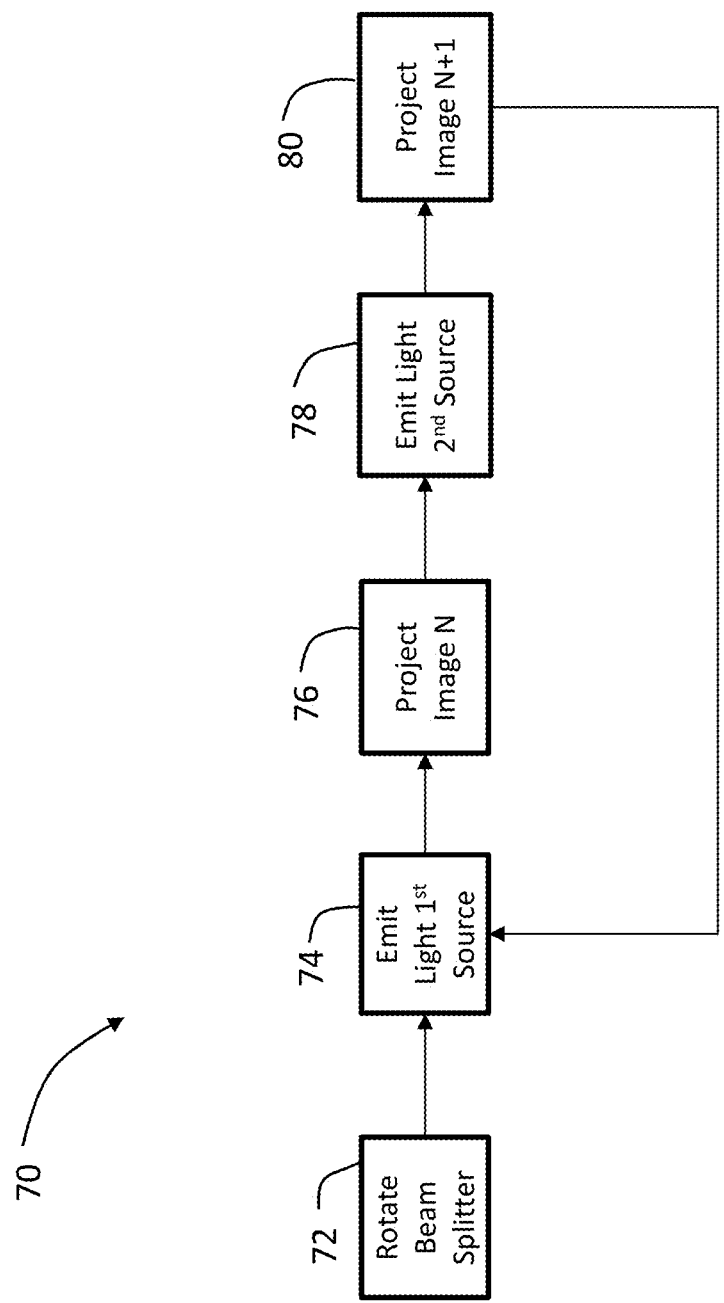
FIG. 2 is a flow chart for a method of operating a three-dimensional image projector in accordance with an embodiment of the invention; and, FIG. 3 is a flow chart for another method of operating a three-dimensional image projector in accordance with another embodiment of the invention.

Referring now to FIG. 2, a method 70 is shown for operating a three dimensional image projector, such as projector 20 for example. The method 70 starts in block 72 with rotating the PBS 54. The method 70 then emits a light from a first light source in block 74, such as light source 22 for example. The light from the first light source reflects off of the PBS 54 and onto an imaging device, such as LCoS imaging device 62 for example. The light is reflected off of the imaging device and through one or more lenses 66 to project an image N out of the projector 20 in block 76. Sequentially the second light source, such as light source 24 for example, emits a light in block 78 which is reflected off of the PBS 54 and onto the imaging device. The light reflects off of the imaging device and is projected out of the projector 20 in block 80. The method 70 then loops back to block 74 to continue projecting images from the projector 20. It should be appreciated that the image N and the image N+1 are similar but slightly offset to create a three-dimensional effect for a user wearing polarized passive glasses.

Figure 3:
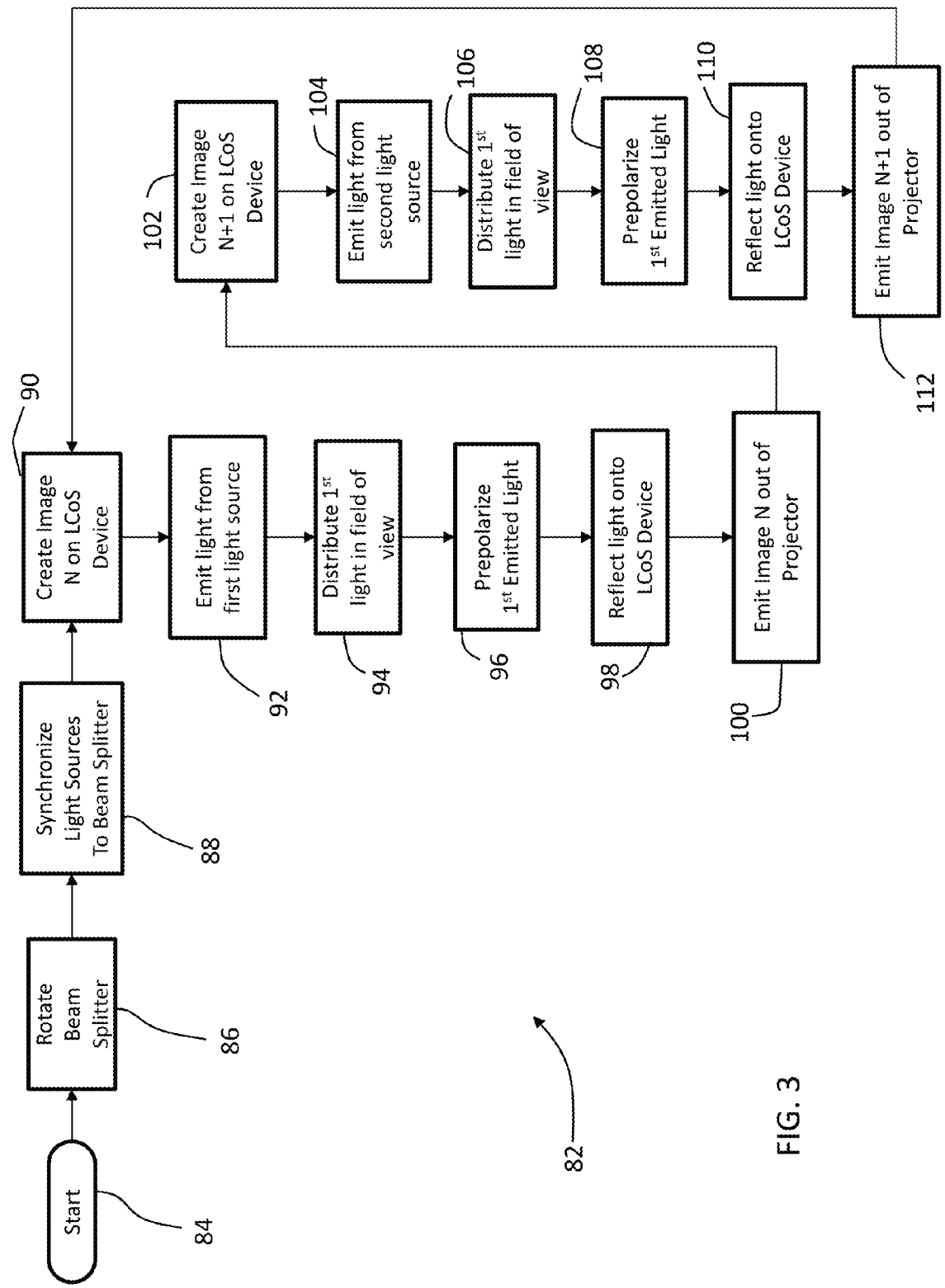

Referring now to FIG. 3, another embodiment of a method 82 is shown for operating a three dimensional image projector, such as projector 20 for example. The method 82 begins in start block 84 and proceeds to block 86 where a polarizing beam splitter, such as PBS 54 for example, is rotated. The polarizing beam splitter may be rotated at a constant speed or at a variable speed. The method 82 then proceeds to block 88 where the light sources, such as light sources 22, 24 for example, receive a modulation signal to synchronize the timing of light being emitted from the light sources with the polarizing beam splitter. An image "N" is created on an imaging device in block 90. Light is emitted from the first light source in block 92. This first light is distributed, such as with a fly's eye lens in block 94 and directed through a pre-polarizing lens in block 96. This first light is reflected off of the polarizing beam splitter onto the imaging device in block 98. The first light reflects the image off of the imaging device and through a projecting lens to emit the image N from the projector in block 100.

The method 82 then proceeds to block 102 where an image N+1 is created on the imaging device. The second light source is activated in block 104 to emit light. This second light is then distributed with a lens, such as a fly's eye lens for example, in block 106 and a lens pre-polarizes the second light in block 108. The second light is then reflected off of the polarizing beam splitter and onto the imaging device in block 110. The light reflecting off of the imaging device is polarized with a polarization that is different from the first light reflected from the imaging device. The second reflected light is transmitted through the projecting lens to emit image N+1 from the projector in block 112. It should be appreciated that the image N and the image N+1 are similar but slightly offset to create a three-dimensional effect for a user wearing polarized passive glasses.

In one embodiment, the polarizing beam splitter is rotated at a constant rotational speed. This provides advantages and simplifies the modulation of the light sources since once the light sources and polarizing beam splitter are synchronized, the modulation signal may not be needed. In another embodiment, the rotational speed of the polarizing beam splitter may be varied or staggered. In one embodiment, the rotation of the polarizing beam splitter may be stopped during operation. This provides advantages in reducing the power consumption of the projector and may further allow a two-dimensional image to be emitted using only one of the light sources.

Embodiments of the present invention provide for a small, reliable three-dimensional projector. Embodiments of the present invention provide advantages of having multiple light sources that are arranged to have the same path length for projecting the image. Embodiments provide advantages in emitting a three-dimensional image usable with passive glasses.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method comprising:
providing a first light source, the first light source emitting light at a first polarization in a first direction along a common optical axis;
providing a second light source opposite the first light source, the second light source emitting light at a second polarization in a second direction along the common optical axis, the second direction being oriented 180 degrees apart from the first direction;
providing a liquid crystal on silicone (LCoS) image device, the LCoS image device having a face oriented in a third direction, the third direction being perpendicular to the common optical axis;
providing a beam splitter device positioned between the first light source and the second light source adjacent the LCoS image device, the beam splitter device positioned to receive light from the first light source and the second light source;
rotating the beam splitter device about an axis, the axis being perpendicular to the common optical axis, first direction, the second direction and the third direction, the beam splitter device configured to reflect light having the first polarization and transmit light having the second polarization;
emitting a first light from the first light source along the common optical axis;
reflecting the first light with the beam splitter device in the third direction directly onto the LCoS image device;
emitting a second light from the second light source along the common optical axis after the first light is emitted;
reflecting the second light with the beam splitter device in the third direction onto the LCoS image device;
displaying a first image on the LCoS image device at a first time;
displaying a second image on the LCoS image device at a second time, the second time not being the same as the first time wherein the emission of first light and the emission of the second light is synchronized with the rotation of the beam splitter device to sequentially emit the first light when the LCos image device displays the first image and the second light when the LCos image device displays the second image; and
defining a three dimensional image by projecting the first light and second light.

2. The method of claim 1 further comprising:
providing a projection lens adjacent the beam splitter device opposite the LCoS image device;
emitting the first light reflected from the LCoS image device through the projection lens; and,
emitting the second light reflected from the LCoS image device through the projection lens.

3. The method of claim 2 further comprising:
transmitting a modulation signal to the first light source and the second light source;
wherein the rotation of the beam splitter device is two times a frequency of the modulation signal;
wherein the step of synchronizing the emission of the first light, the second light and the rotation of the beam splitter device is based at least in part on the modulation signal.

4. The method of claim 3 further comprising:
providing a first fly's eye array between the first light source and the beam splitter device;
providing a first pre-polarizer lens between the first fly's eye array and the beam splitter device;

providing a first focusing lens between the first pre-polarizer lens and the beam splitter device;
providing a second fly's eye array between the second light source and the beam splitter device;
providing a second pre-polarizer lens between the second fly's eye array and the beam splitter device; and,
providing a second focusing lens between the second pre-polarizer lens and the beam splitter device.

5. The method of claim 4 wherein:
the first light source includes a first red light emitting diode (LED), a first green LED and a first blue LED;
the first light is comprised of light emitted from the first red LED, the first green LED and the first blue LED that is combined by a first dichroic color combiner;
the second light source includes a second red light emitting diode (LED), a second green LED and a second blue LED; and,
the second light is comprised of light emitted from the second red LED, the second green LED and the second blue LED that is combined by a second dichroic color combiner.

6. The method of claim 1 wherein the beam splitter device is rotated at a constant speed.

7. The method of claim 1 wherein the beam splitter device is rotated at a variable speed.

8. The method of claim 1 wherein the first light source, the second light source, the LCoS image device and the beam splitter are arranged within a space 5-10.5 mm in height, 20-37 mm in width and 20-37 mm in length.

9. The method of claim 1 wherein the first light source, the second light source, the LCoS image device and the beam splitter use less than or equal to 30 milliwatts.

* * * * *